United States Patent
Bhalla et al.

(10) Patent No.: US 10,343,953 B2
(45) Date of Patent: *Jul. 9, 2019

(54) PROCESS FOR MANUFACTURING LIQUID AND SOLID ORGANIC FERTILIZER FROM ANIMAL MANURE

(71) Applicant: EnviroKure, Incorporated, Philadelphia, PA (US)

(72) Inventors: Sushil K. Bhalla, Schwenksville, PA (US); Gregory J. Dicosola, Westmont, IL (US); Devon K. Hooper, Leesburg, NJ (US); Sarabjit S. Randhava, Evanston, IL (US); Michael A. Laughlin, Philadelphia, PA (US)

(73) Assignee: EnviroKure, Incorporated, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,002

(22) Filed: Jun. 11, 2018

(65) Prior Publication Data
US 2019/0010094 A1 Jan. 10, 2019

Related U.S. Application Data

(63) Continuation of application No. 15/628,878, filed on Jun. 21, 2017, now Pat. No. 9,994,493, which is a
(Continued)

(51) Int. Cl.
*C05F 3/00* (2006.01)
*C05B 17/00* (2006.01)
(Continued)

(52) U.S. Cl.
CPC .............. *C05F 3/00* (2013.01); *A01C 3/00* (2013.01); *C05B 17/00* (2013.01); *C05F 17/009* (2013.01);
(Continued)

(58) Field of Classification Search
CPC ........................................................ C05F 3/00
See application file for complete search history.

(56) References Cited

U.S. PATENT DOCUMENTS

3,718,451 A 2/1973 Baumann
3,865,568 A 2/1975 Kratzer
(Continued)

FOREIGN PATENT DOCUMENTS

WO WO 99/46209 A1 9/1999
WO WO 2013/028776 A1 8/2012

OTHER PUBLICATIONS

International Search Report and Written Opinion for International Patent Application No. PCT/US2012/051895, dated Oct. 23, 2012.
(Continued)

*Primary Examiner* — Wayne A Langel
(74) *Attorney, Agent, or Firm* — Potter Anderson and Corroon, LLP

(57) ABSTRACT

Processes for manufacturing organic fertilizer products, such as liquid and solid organic fertilizer, from animal manure are disclosed, together with the fertilizer products produced therefrom.

20 Claims, 3 Drawing Sheets

Related U.S. Application Data continuation of application No. 14/623,602, filed on Feb. 17, 2015, now Pat. No. 9,688,584.

(60) Provisional application No. 61/940,563, filed on Feb. 17, 2014, provisional application No. 62/026,188, filed on Jul. 18, 2014.

(51) Int. Cl.
*C05F 17/00* (2006.01)
*A01C 3/00* (2006.01)
*C05G 3/00* (2006.01)

(52) U.S. Cl.
CPC ........ *C05F 17/0063* (2013.01); *C05G 3/0064* (2013.01); *Y02A 40/205* (2018.01); *Y02P 20/145* (2015.11); *Y02W 30/43* (2015.05)

(56) References Cited

U.S. PATENT DOCUMENTS

| | | | |
|---|---|---|---|
| 3,939,280 A | 2/1976 | Karnemaat | |
| 3,966,450 A | 6/1976 | O'Neill et al. | |
| 4,160,656 A | 7/1979 | Junkermann | |
| 4,311,511 A | 1/1982 | Graefe | |
| 4,459,149 A | 7/1984 | Moran et al. | |
| 5,174,805 A | 12/1992 | Masuda | |
| 5,354,349 A | 10/1994 | Inoue | |
| 5,393,317 A | 2/1995 | Robinson | |
| 5,401,291 A | 3/1995 | Inoue | |
| 5,501,718 A | 3/1996 | Bandurski | |
| 5,730,772 A | 3/1998 | Staples | |
| 6,364,926 B1 | 4/2002 | Gryzik et al. | |
| 6,764,661 B1 | 7/2004 | Girard | |
| 7,647,311 B2 | 1/2010 | Tenorio et al. | |
| 7,662,205 B2 | 2/2010 | Burnham | |
| 8,409,620 B2 | 4/2013 | Livingston | |
| 8,673,046 B1 | 3/2014 | Szogi et al. | |
| 9,688,584 B2 | 6/2017 | Bhalla et al. | |
| 9,994,493 B2 * | 6/2018 | Bhalla ....................... | C05F 3/00 |
| 2002/0108904 A1 | 8/2002 | Blackburn | |
| 2002/0182710 A1 | 12/2002 | Horn et al. | |
| 2003/0041638 A1 | 3/2003 | Lamour et al. | |
| 2004/0031302 A1 | 2/2004 | Eswaran et al. | |
| 2004/0040516 A1 | 3/2004 | Jensen | |
| 2004/0065127 A1 | 4/2004 | Connell | |
| 2004/0182780 A1 | 9/2004 | Lee | |
| 2004/0265266 A1 | 12/2004 | Champ et al. | |
| 2005/0193790 A1 | 9/2005 | Hartman | |
| 2006/0254331 A1 | 11/2006 | Burnham | |
| 2009/0188290 A1 | 7/2009 | Marler | |
| 2009/0193863 A1 | 8/2009 | Szogi et al. | |
| 2010/0288003 A1 | 11/2010 | Burnham et al. | |
| 2010/0303551 A1 | 12/2010 | Chang | |
| 2011/0079060 A1 | 4/2011 | Hackett et al. | |
| 2011/0247378 A1 | 10/2011 | Begley et al. | |
| 2011/0303157 A1 | 12/2011 | Laubenstein | |
| 2012/0122196 A1 | 5/2012 | Johnson | |
| 2012/0269905 A1 | 12/2012 | Mockhov et al. | |
| 2013/0019645 A1 | 1/2013 | Crabtree et al. | |
| 2013/0186155 A1 | 7/2013 | Blaine | |
| 2014/0196512 A1 | 7/2014 | Shaimukhambetova | |
| 2014/0338411 A1 | 11/2014 | Nunn | |
| 2016/0318819 A1 | 11/2016 | Josse et al. | |

OTHER PUBLICATIONS

International Preliminary Report on Patentability for International Patent Application No. PCT/US2012/051895, dated Feb. 25, 2014.
Restriction Requirement in U.S. Appl. No. 13/591,995, dated Apr. 14, 2014.
Non-Final Office Action in U.S. Appl. No. 13/591,995, dated Jul. 8, 2014.
Final Office Action in U.S. Appl. No. 13/591,995, dated Feb. 4, 2015.
Non-Final Office Action in U.S. Appl. No. 13/591,995, dated Dec. 3, 2015.
Final Office Action in U.S. Appl. No. 13/591,995, dated Jul. 6, 2016.
Notice of Allowance in U.S. Appl. No. 13/591,995, dated Jan. 4, 2017.
Non-Final Office Action in U.S. Appl. No. 14/623,602, dated Aug. 28, 2015.
Non-Final Office Action in U.S. Appl. No. 14/623,602, dated Mar. 10, 2016.
Non-Final Office Action in U.S. Appl. No. 14/623,602, dated Aug. 8, 2016.
Final Office Action in U.S. Appl. No. 14/623,602, dated Jan. 24, 2017.
Notice of Allowance in U.S. Appl. No. 14/623,602, dated May 22, 2017.
Non-Final Office Action in U.S. Appl. No. 15/628,878, dated Sep. 5, 2017.
Notice of Allowance in U.S. Appl. No. 15/628,878, dated Feb. 14, 2018.
Legault et al., "Aerobic Digestion of Poultry Manure to Produce Biologically Active Greenhouse Nutrient Solutions," Alberta Agriculture and Rural Development.
Mochalov et al., "The Use of Stimulators Made of Aqueous Extract from Bark and Chicken Manure Compost and Heteroauxin when Pricking Out Containerized Pine Seedlings," Lesnoy Zhurnal, 2015(5):67-76 (2015). See pp. 74-75 for English Abstract.
Nofziger-Dasupta, "Innovative Aerobic Technology for Organic Fertilizer," Envirokure, Inc. (Dec. 17, 2014).

* cited by examiner

PROCESS FOR MANUFACTURING LIQUID AND SOLID ORGANIC FERTILIZER FROM ANIMAL MANURE

CROSS-REFERENCE TO RELATED APPLICATIONS

Continuation of U.S. application Ser. No. 15/628,878 filed Jun. 21, 2017, which is a Continuation of U.S. application Ser. No. 14/623,602, filed Feb. 17, 2015, issued Jun. 27, 2017 as U.S. Pat. No. 9,688,584, claiming benefit of the filing date of U.S. Provisional Application Ser. No. 61/940,563, filed Feb. 17, 2014, and U.S. Provisional Application Ser. No. 62/026,188, filed Jul. 18, 2014, the entire contents of each of which is incorporated by reference herein.

BACKGROUND

Technical Field

The present disclosure relates to organic fertilizer products and processes for manufacturing such products.

Technical Background

Fertilizer products can generally comprise organic or inorganic materials of natural or synthetic origin that can supply one or more essential nutrients to plants. In varying proportions, fertilizer products can generally provide one or more primary nutrients, such as, for example, nitrogen (N), phosphorus (P), and potassium (K); optionally one or more secondary nutrients, such as, for example, calcium (Ca), magnesium (Mg), and sulfur (S); and optionally one or more micronutrients, such as, for example, boron (B), chlorine (Cl), copper (Cu), iron (Fe), manganese (Mn), molybdenum (Mb), zinc (Zn), and nickel (Ni).

Primary and secondary nutrients can be consumed by plants in large quantities, and can be present in plant tissues at levels ranging from 0.15 wt. % to 6 wt. % on a dry matter basis (i.e., 0% moisture). Micronutrients can be consumed in smaller quantities, and can be present in plant tissues at part per million levels, for example, from about 0.15 ppm to about 400 ppm on a dry matter basis.

Other micronutrients required by plants, such as carbon, hydrogen, and oxygen can be supplied via water, such as rainfall or irrigation, and carbon dioxide from the atmosphere.

Organic fertilizer products have been known to improve biodiversity (i.e., soil life) and long term productivity of soils, and may also provide large repositories for carbon dioxide. Organic nutrients can increase the abundance of soil organisms by providing organic matter and micronutrients, such as, for example, mycorrhizae (i.e., fungi that can aid plants in absorbing nutrients), and can significantly reduce the need for pesticide applications.

Conventional organic fertilizers, such as, for example, unprocessed chicken manure, worm castings, compost, seaweed, and naturally occurring mineral deposits are typically solid materials, which limits their use due to labor and equipment costs and regulatory restrictions.

In addition, while the use of organic fertilizer products are increasing due to a desire for environmentally friendly materials, most conventional organic fertilizer products contain lower quantities of nutrients and require extended periods of time to breakdown into useful soil materials.

Thus, there is a need for improved organic fertilizer products that can provide desirable quantities of nutrients to plants and soils, without the additional labor and equipment costs and regulatory restrictions associated with conventional organic fertilizer products. These needs and other needs are satisfied by the processes and products of the present disclosure.

SUMMARY

In accordance with the purpose(s) of the invention, as embodied and broadly described herein, this disclosure, in one aspect, relates to processes for the manufacture of liquid and solid organic fertilizer products.

In one aspect, the present disclosure provides a process for manufacturing an organic fertilizer product, the process comprising: providing an animal waste composition comprising an animal waste, contacting the animal waste composition with an acid to produce a stabilized animal waste composition, aerating the animal waste composition, and separating a solid component and a liquid component of the stabilized animal waste composition.

In a second aspect, the present disclosure provides a process as described above, wherein aerobic conditions are maintained throughout the process.

In a third aspect, the present disclosure provides a process as described above, further comprising subjecting the separated liquid component to an autothermal thermophilic aerobic bioreaction.

In a fourth aspect, the present disclosure provides a process as described above, wherein the autothermal thermophilic aerobic bioreaction comprises maintaining aerobic condition and a temperature suitable for the promotion of thermophilic bacteria for a period of time.

In a fifth aspect, the present disclosure provides an organic fertilizer product prepared from the methods described herein.

In a sixth aspect, the present disclosure provides an organic fertilizer free from or substantially free from pathogens.

BRIEF DESCRIPTION OF THE FIGURES

The accompanying figures, which are incorporated in and constitute a part of this specification, illustrate several aspects and together with the description serve to explain the principles of the invention.

Figure 1:
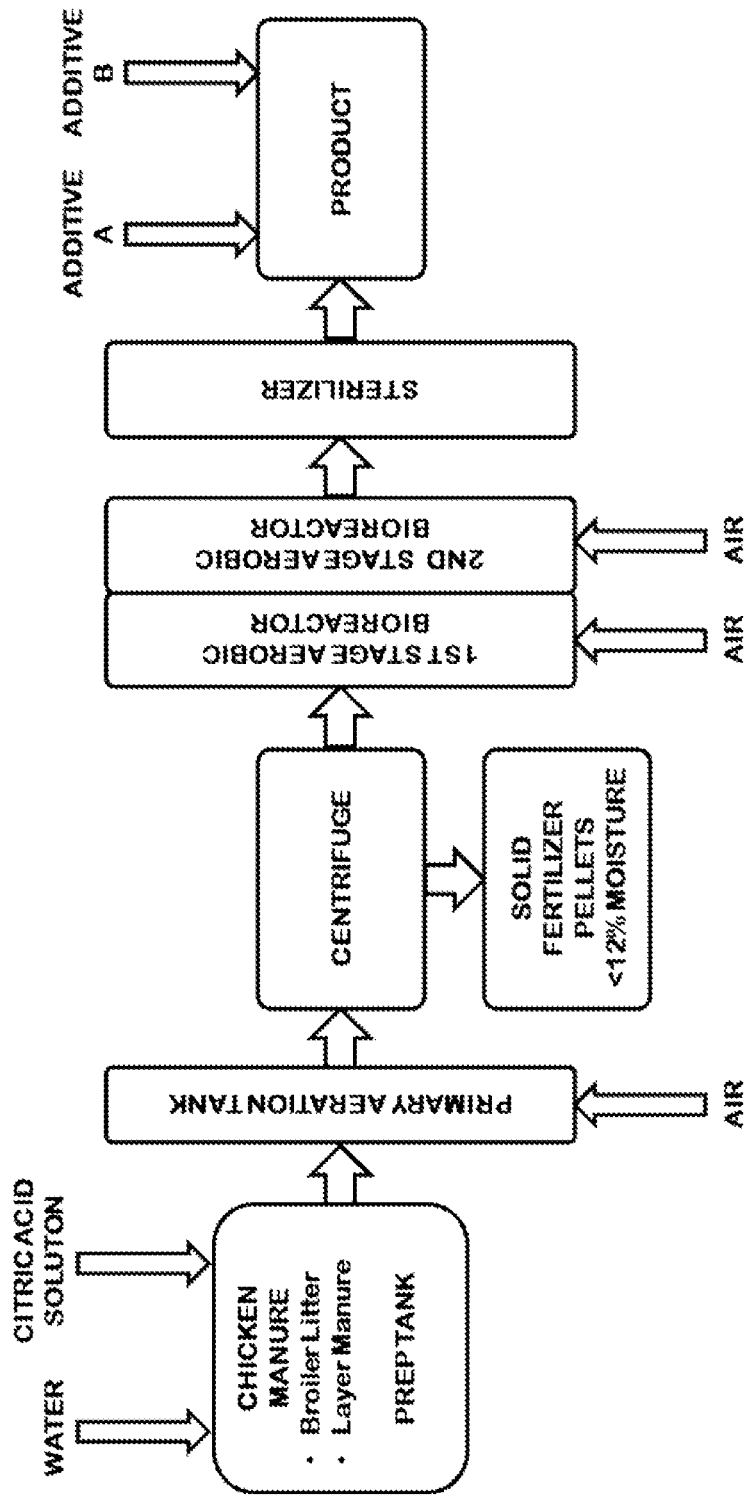
FIG. 1 is a schematic of an exemplary process for manufacturing organic fertilizer products from animal manure, in accordance with various aspects of the present invention.

Additional aspects of the invention will be set forth in part in the description and figures which follow, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a solvent" includes mixtures of two or more solvents.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B—F, C-D, C-E, and C—F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art. Each of the tanks, vessels, transfer lines, pumps, valves, etc. recited herein are commercially available or can be fabricated by those of ordinary skill in the art. Moreover, such tanks, vessels, and the like, can be made of any material, such as, for example, stainless steel, suitable for use in handling the waste, chemicals, and environmental conditions described herein.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the term "buffer solution" is intended to refer to an aqueous solution comprising a weak acid and a weak base. A buffer solution is intended to minimize or prevent changes in the pH of a solution or mixture. The pH of a buffered solution (i.e., a solution or mixture comprising a buffer solution) does not change or changes very little upon addition of a small amount of a strong acid or base.

As used herein, the term "colloid" is intended to refer to a microscopic dispersion of a substance throughout another substance. In one aspect, particles having a diameter of from about 1 micrometer to about 1,000 micrometers can be dispersed in another substance, such as a solution.

As used herein, the term "thixotropic" is intended to refer to a shear thinning property.

As used herein, the term "sterilization" is intended to refer to a heat treatment process that eliminates, renders inert, or inactivates pathogens, including transmissible agents such as fungi, bacteria, viruses, spore forms, etc. present on a surface or contained in a fluid. Sterilization is not intended to imply the elimination of all forms of life.

As used herein, the term "thermal stabilization" is intended to refer to a process that eliminates or reduces the population of bacteria that cause anaerobic decomposition of organic matter.

As used herein, the term "organic" is intended to refer to a natural source, for example, of a starting material. While not intended to be limiting, a starting material for an organic fertilizer can comprise plant and/or animal byproducts, rock powder, seaweed, inoculants, conditioners, dairy product waste, livestock manure, liquid manure, worm castings, peat, guano, compost, blood meal, bone meal, fish meal, decomposing crop residue, cheese whey, mixed liquor from food and/or livestock processing facilities, wastewater from food processing operations, and any combination thereof. In another aspect, any naturally sourced material that can provide nitrogen, phosphate, and/or potash can be, for example, a starting material for an organic fertilizer product.

As used herein, the term "animal waste" or "animal manure solids" is intended to refer to manure solids that are present in a composition or an animal waste slurry that contains manure. Solids content refers to the amount of solids present in a composition that remain after water has been removed or allowed to evaporate. In one aspect, "animal waste" can refer to chicken manure. In other aspects, "animal waste" can refer to waste from other animals, such as, for example, hogs, turkey, or other animals not specifically recited herein. In yet another aspect, "animal waste" can refer to a mixture of waste products from two or more types of animals.

As used herein, the term "chicken manure" is intended to refer to chicken excreta that can be used as a fertilizer.

As used herein, the term "layered manure" is intended to refer to an unadulterated waste product from egg laying chickens.

As used herein, the term "hydrolyzed feather meal" is intended to refer to a product made from poultry feathers by partially hydrolyzing the feathers under elevated heat and pressure. In one aspect, a hydrolyzed feather meal can optionally be further processed prior to introduction into a manure manufacturing process or incorporation with organic fertilizer products, as described herein.

As used herein, the terms "poultry litter" and "broiler litter" are intended to refer to material used as bedding in poultry operations to, for example, ease the handling of manure. Conventional poultry litter and broiler litter can comprise wood shavings, sawdust, peanut hulls, shredded sugar cane, straw, and/or other absorbent, low-cost, organic materials.

As used herein, the term "manure slurry" is intended to refer to a mixture of manure and any liquid, e.g., urine and/or water. Thus, in one aspect, a manure slurry can be formed when animal manure and urine are contacted, or when manure is mixed with water from an external source. No specific moisture and/or solids content is intended to be implied by the term slurry.

As used herein, the term "aerobic decomposition" is intended to refer to the decomposition of organic matter in the presence of oxygen. In one aspect, aerobic decomposition is intended to refer to an aerobic decomposition process that proceeds at a rate greater than a comparable naturally occurring decomposition.

Conventional Fertilizer Products

Fertilizers products are available in various forms. The most typical form of fertilizer products is solid fertilizer in granulated or powdered form. The next most common form of fertilizer product is liquid fertilizer. In various aspects, liquid fertilizer products can be advantageous as they can provide more immediate effects, wide coverage, and are relatively easy to use compared to solid fertilizer products.

Other fertilizer products can be designed to slowly release one or more nutrients. Such slow release fertilizer products, such as fertilizer spikes, tablets, etc, can reduce the burning effect resulting from application of large amounts of nitrogen. Other slow-release fertilizer products can comprise polymer coatings to provide a time-release effect or staged release of nutrients.

With the increased desirability of environmentally friendly products, organic fertilizer products are becoming more popular. Conventional organic fertilizer products have lower nutrient levels and break down slowly into complex organic structures (e.g., humus), which can improve soil structure and the ability to retain moisture and nutrients. Organic nutrients can also increase the abundance of soil organisms by providing organic matter and micronutrients for such organisms. Organic fertilizer products can also improve the biodiversity (i.e., soil life) and long term productivity of a soil, and can provide large repositories for storage of carbon dioxide, but use of these organic fertilizer products can be limited by higher labor and equipment costs and regulatory restrictions.

Animal Waste

Poultry and other livestock are commonly reared in facilities that are designed to manage manure and liquid waste generated by such animals. For example, poultry are typically raised on beds of litter that contain a filler such as wood shavings, wood chips and/or saw dust, spilled food, feathers, and manure. After a growout on the bed of litter and during successive growouts, the litter is predominantly manure, and is eventually replaced with fresh bedding.

In addition to livestock production, farmers raise poultry for the production of eggs. Through industry advances, farmers now raise these animals in cages in buildings reaching as high as six stories. The large amount of manure produced is often accumulated and stored in outdoor holding areas.

Farmers manage the manure and liquid waste from livestock rearing facilities in several ways. For example, many farmers apply the manure and liquid waste onto agricultural fields. Other farmers spread the manure and liquid waste from the facilities directly onto their land.

Manure excreted by poultry and other livestock typically contains a variety of pathogens, including *Salmonella*, Coliform, Fecal Coliform, Soil Transmitted Helminths (hookworm, *Ascaris*, and whipworm), *Campylobacter*, Avian Influenza, *Histoplasma, Capsulatum* Fungus, and *Escherichia coli*. The presence of these pathogens poses health risks to farm workers handling the manure. In addition, the use or distribution of manure containing these pathogens on agricultural crops can pose health and environmental concerns to farm workers and consumers.

In various aspects, the methods of the present disclosure can utilize and/or treat animal manure from a variety of animals, such as, for example, poultry. In one aspect, the animal waste stream to be treated can comprise poultry manure. In other aspects, the waste stream can comprise animal waste, feces, urine, food, bedding materials, such as wood chips and/or sawdust, feathers, and other materials. In another aspect, a poultry litter can contain one or more harmful microorganisms, such as bacteria, viruses, protozoa, and/or other parasites or pathogens.

Animal waste can be provided from an on-site facility or can be delivered, for example, in bulk quantities by truck. It should also be understood that the properties, for example, the nutrient content and physical properties of a given animal waste product can vary depending upon, for example, the type of animal and/or rearing or growth facility, length of time the animal waste has been stored, environmental conditions, etc. In one aspect, properties, such as, for example, nitrogen content, phosphorus content, potassium content, calcium content, sulfur content, boron content, magnesium content, molybdenum content, sodium content, manganese content, zinc content, iron content, copper content, moisture, and pH, can vary depending upon the type of animal and/or rearing or growth facility. For example, poultry litter animal waste can contain woodchips, sawdust, feathers, and/or other materials in addition to feces, and the moisture content can vary depending upon whether the litter originated in a broiler or egg-laying facility. Poultry litter can comprises a variety of materials of varying size.

The conventional methods to handle manure and liquid waste products from poultry and livestock production facilities do not address the health and environmental concerns described herein. Thus, the abundance of animal manure, such as chicken manure, and the problems associated with its disposal led to the development of a new process for manufacturing organic liquid and solid fertilizers by aerobic decomposition of animal manure, as described herein.

Aerobic bacteria ("aerobes") are important decomposers and are very abundant in animal manure, such as, for example, chicken manure. In one aspect, a gram of soil or decaying organic matter can comprise millions of aerobic bacteria. Aerobic bacteria are the most nutritionally diverse of all organisms and can eat nearly anything. Aerobic bacteria utilize carbon as a source of energy and nitrogen to build protein, so that they can grow and reproduce. Aerobic bacteria obtain energy by oxidizing organic material, especially the carbon fractions. While bacteria can eat a wide variety of organic compounds, they can have difficulty escaping unfavorable environments due to their size and lack of complexity. Changes in oxygen, moisture, temperature, or acidity can result in inactivity or death. Aerobic bacteria typically need oxygen levels greater than 5% in air to survive.

In one aspect, aerobic bacteria are preferred for the present invention due to the fact that they can rapidly and effectively decompose organic matter. Aerobic bacteria can also excrete desirable nutrients such as nitrogen, phosphorus, and magnesium. When oxygen levels fall below 5% in air, aerobes begin to die and decomposition can slow by as much as 90%. At this point, anaerobic micro-organisms take over and, in the process, produce significant quantities of useless organic acids and amines (ammonia like substances), along with other noxious compounds such as hydrogen sulfide, cadaverine, and putrescine. These compounds can be malodorous and can contain unavailable nitrogen compounds. In some aspects, the products of anaerobic bacteria can be toxic to certain plant species. Thus, it is desirable to minimize or prevent the growth of anaerobic bacteria during the decomposition process. Anaerobic metabolism can produce low molecular weight organic acids, such as, for example, propionic, acetic, and butyric acid. These acids can be phytotoxic to plants. Anaerobic fertilizer products typically require months to cure and get rid of these compounds. In other aspects, other anaerobic decomposition byproducts can inhibit seed germination and root elongation in certain plant species.

In one aspect, different types of bacteria can aid in aerobic decomposition, depending upon, for example, the temperature of the environment and/or organic matter being decomposed. For example, psychrophilic bacteria work in the lowest temperature range, are most active at about 13° C., and will work up to about 21° C., where mesophilic bacteria begin to take over. Mesophilic bacteria can rapidly decompose organic matter, producing acids, carbon dioxide and heat. Mesophilic bacteria have an effective working temperature range of from about 21° C. to about 37° C. Above approximately 37° C., mesophilic bacteria begin to die off, and are replaced by heat-loving thermophilic bacteria which thrive at temperatures ranging from about 57° C. to about 71° C. Thermophilic bacteria consume significant quantities of degradable materials and as a result, cannot sustain their population for an extended period of time. As the population of thermophilic bacteria decline and the temperature of the organic matter cools, mesophilic bacteria again become active and can consume any remaining organic material, together with the assistance of other microorganisms. In general, temperatures above about 60° C. are needed to kill non-desirable organisms like pathogens and the seeds of weed species. At temperatures above about 71° C., organic materials can become sterile and lose disease fighting properties.

The methods of the present disclosure can be effective for treating any animal manure, and especially poultry manure and livestock manure. In one aspect, the animal manure can be present as a liquid slurry. In a further aspect, the disclosed methods can be effective for treating a nutrient-rich animal manure that can be useful for producing fertilizer. Non-limiting examples of animals commonly reared in such operations include sheep, swine, poultry, goats, cattle, dairy cows, ducks, geese, and rabbits. In a still further aspect, the invention is especially applicable to poultry rearing, swine rearing, and dairy cow rearing operations.

In another aspect, the organic fertilizer products prepared by the method of the present disclosure can, when applied to a soil, provide one or more of the following: nourish the soil in a natural manner, provide a balanced release (i.e., slow and fast release) of nutrients, establish improved water retention of the soil, improve soil porosity, deliver deeper root penetration of nutrients, or a combination thereof.

In another aspect, the methods described herein do not result in the loss of nitrogen and/or phosphorus in an animal waste material. The resulting organic liquid fertilizer products can be useful as, for example, a fertilizer spray or additive into other products. Similarly, the solid organic fertilizer products can be spread onto fields or crops, or can be incorporated into other agricultural compositions. In a further aspect, the resulting organic fertilizer products of the present invention can be useful in lawn and garden markets. In still further aspects, the products can be used in turf management applications. In still further aspects, products produced by the disclosed methods can be retail packaged for use by consumers. In an even further aspect, the products can be used in professional activities, for example, in horticulture-related activities.

In one aspect, the methods of the present disclosures are directed to the production of organic fertilizers from animal manure. In various aspects, the methods of the present disclosure can provide liquid organic fertilizer products and/or solid organic fertilizer products. In another aspect, solid organic fertilizer products produced by the methods of the present disclosure can have a moisture content of less than about 12 wt. %.

Method for Treating Animal Manure

As briefly described above, the present disclosure relates to methods for treating animal manure and waste products from, for example, poultry and livestock production facilities. In one aspect, the methods of the present disclosure can comprise contacting animal manure with a treatment composition. In another aspect, the waste product can comprise poultry manure and contaminated bedding materials. In still another aspect, the methods described herein can at least partially detoxify animal feces or a composition comprising animal feces. In yet another aspect, the methods can utilize organic materials and can produce a nutrient rich liquid and/or solid organic product that can be useful as fertilizer. In still another aspect, the methods described herein can provide a nutrient rich liquid and/or solid organic fertilizer product that is free from or substantially free from pathogens. In one aspect, an organic fertilizer product prepared from the methods of the present disclosure can be free from or substantially free from pathogens, as determined by one or more of the following test procedures: United States Environmental Protection Agency (EPA) 1682 "*Salmonella* in Sewage Sludge (Biosolids) by Modified Semisolid Rappaport-Vassiliadis (MSRV) Medium; EPA 1681 "Fecal Coliforms in Sewage Sludge (Biosolids) by Multiple-Tube Fermentation using A-1 medium; United States Food and Drug Administration (FDA) Bacteriological Analytical Manual (BAM), $8^{th}$ edition, chapter 4; polymerase chain reaction assay via BAXTM; or a combination thereof.

In one aspect, the methods and apparatus described herein can be used as a stationary system, for example, wherein animal waste materials can be transported from a rearing or growth facility. In another aspect, the methods and apparatus described herein can be used as a mobile system, for example, that can be temporarily located at a rearing or growth facility to treat animal waste, and then can subsequently be moved to another location. In one aspect, an animal manure can be provided in bulk form, for example, from a truck equipped with a transfer screw. In other aspects, the methods described herein or any portion thereof can be performed in a continuous, semi-continuous, or batch process.

In various aspects, the disclosed methods can convert animal manure, through a series processes, into a solid and/or a liquid fertilizer. In a further aspect, fertilizer produced by the disclosed methods can meet the requirements for organic fertilizer. In a yet further aspect, the disclosed methods can be used for many types of animal waste. In a specific aspect, the disclosed methods are particularly useful for chicken manure, including dry manure and liquids, for example, from broiler chicken and egg-laying chicken facilities, respectively. As described above, animal waste can be utilized from an on-site facility or can be provided in bulk, for example, by truck or a conveyor system.

While not intended to be limiting, the composition of an exemplary chicken manure, prior to treatment, is detailed in Table 1, below.

TABLE 1

Composition of Exemplary Chicken Manure

| Raw Chicken Manure NUTRIENTS | | Analysis |
|---|---|---|
| Nitrogen | | |
| Total Nitrogen | % | 2.05 |
| Organic Nitrogen | % | 0.66 |
| Ammonium Nitrogen | % | 1.387 |
| Nitrate Nitrogen | % | <0.01 |
| Major and Secondary Nutrients | | |
| Phosphorus | % | 0.86 |
| Phosphorus as P2O5 | % | 1.97 |
| Potassium | % | 1.04 |
| Potassium as K2O | % | 1.25 |
| Sulfur | % | 0.22 |
| Calcium | % | 3.34 |
| Magnesium | % | 0.28 |
| Sodium | % | 0.16 |
| Micronutrients | | |
| Zinc | ppm | 198 |
| Iron | ppm | 668 |
| Manganese | ppm | 140 |
| Copper | ppm | <20 |
| Boron | ppm | 30 |
| Other Properties | | |
| Moisture | % | 70.18 |

TABLE 1-continued

Composition of Exemplary Chicken Manure

| Raw Chicken Manure NUTRIENTS | | Analysis |
|---|---|---|
| Total Solids | % | 29.82 |
| C:N Ratio | | 4.5:1 |
| Total Carbon | % | 9.1 |
| Chloride | % | 0.31 |
| pH | | 8.30 |

It should be understood that the treatment methods described herein can comprise multiple individual steps, and that unless recited otherwise, the steps can be performed in any order. It should also be understood that multiple individual steps can be combined into a single step, and that certain steps are optional, depending upon, for example, the animal waste product to be treated and the desired properties of the resulting product. In other aspects, the order of individual treatment steps can affect the outcome of the process and in such aspects, the treatment steps can be performed in the order described in any of the aspects recited herein or illustrated in the embodiments in the accompanying figures.

In one aspect, an animal waste product can have a moisture content of from about 20% to about 80% or higher, by weight. In various aspects, the moisture content can be adjusted to a level of at least about 75%, by weight, for example, about 75%, 77%, 79%, 81%, 83%, 85%, 87%, 89%, or higher. In other aspects, the moisture content can be adjusted to a level of at least about 80%, by weight, for example, at least about 80%, 82%, 84%, 86%, 88%, 90%, 92%, 94%, 96%, or higher; or to a level of from about 80% to about 85% by weight. It should be understood that the moisture content of an animal waste product or a slurry thereof can vary, depending upon type and age of animal, together with storage and environmental conditions.

In one aspect, the moisture content can be adjusted, if needed, at this or any subsequent step of the process, using water and/or a nutrient enriched liquid. In one aspect, use of a nutrient enriched liquid can minimize and/or eliminate dilution of one or more desirable nutrients that can be present in the animal waste. Exemplary nutrients can include those compounds beneficial for fertilizer or agricultural applications, such as, nitrogen, phosphorus, and potassium. In one aspect, a nutrient enriched liquid can be water derived from the treatment methods described herein, for example, water that has been in contact with animal waste. In another aspect, a nutrient enriched liquid can be separately prepared using animal waste or desirable chemical compounds. In one aspect, the nutrient enriched liquid is prepared from water contacted with animal waste and does not introduce non-organic components into the treatment process. The proportions of nutrient enriched liquid and water, for example, clean or municipal water, used in the treatment process can vary, depending upon the particular animal waste product being treated and/or the desired properties of the resulting treated product, and one of skill in the art could readily determine an appropriate proportion of nutrient enriched liquid and water to be used. In various aspects, the proportion can range from 100% water to 100% nutrient enriched liquid, and the present invention is intended to include all combinations there between.

The pH of an animal waste product can vary, depending upon the type of animal, storage and/or environmental conditions, other materials present in the waste, or other factors. In various aspects, an animal waste product, for example, a poultry litter, can have a pH of from about 7.8 to about 8.8. In one aspect, the pH of an animal waste can be adjusted, for example, to a neutral and/or slightly acidic value. In one aspect, the pH of an animal waste product or a slurry containing animal waste can be measured to determine what, if any, adjustment is needed. One of skill in the art could readily determine the pH of an animal waste product and determine the degree of adjustment to be made. While not wishing to be bound by theory, it is believed that such an adjustment can neutralize any basic compounds present in the animal waste and prevent the formation and/or release of ammonia from nitrogen compounds present in the waste. In various aspects, the pH can be adjusted to a value of from about 3 to about 7, for example, about 3, 3.5, 4, 4.5, 5, 5.5, 6, 6.5, or 7; from about 4 to about 7, for example, about 4, 4.5, 5, 5.5, 6, 6.5, or 7; from about 4.5 to about 7, for example, about 4.5, 5, 5.5, 6, 6.5, or 7; from about 5 to about 7, for example, about 5, 5.2, 5.4, 5.6, 5.8, 6, 6.2, 6.4, 6.6, 6.8, or 7; from about 5.5 to about 7, for example about 5.5, 5.6, 5.7, 5.8, 5.9, 6, 6.1, 6.2, 6.3, 6.4, 6.5. 6.6, 6.7, 6.8, 6.9, or 7; or from about 6 to about 7, for example about 6, 6.1, 6.2, 6.3, 6.4, 6.5. 6.6, 6.7, 6.8, 6.9, or 7. It should be understood that the pH can be less than 6 or greater than 7, and the inventive methods are not intended to be limited to any particular pH value. In another aspect, an animal waste having a pH less than about 6 or greater than about 7 can be treated as described herein. In yet another aspect, an animal waste having a pH of from about 6 to about 7 can be treated as described herein, and can maintain all or substantially all of the nitrogen and/or other nutrients present in the waste as delivered and minimize and/or prevent the loss of nitrogen from the formation and release of ammonia.

In another aspect, if an animal waste product, as delivered, has a pH of from about 6 to about 7, a reduced or no adjustment may be needed.

A pH adjustment, if needed, can be performed using any suitable pH adjusting agent. In one aspect, any acidic compound can be applied and/or contacted with all or a portion of the animal waste product. In another aspect, an acid can be contacted with all or a portion of the animal waste product. Exemplary acids that can be utilized to adjust the pH of an animal waste can comprise citric acid, acetic acid, phosphoric acid, carbonic acid, hydrochloric acid, nitric acid, sulfuric acid, or a combination thereof. In a specific aspect, citric acid can be used. In another aspect, an acid derived from natural sources can be used. In yet another aspect, an acid that can be classified as an organic product can be used. Any pH adjusting agent, such as, for example, an acid, can be contacted as a solid or a liquid. In one aspect, a solution, for example, an aqueous solution of citric acid can be contacted with an animal waste product. In another aspect, a solid, for example, citric acid powder, can be contacted with an animal waste product. In yet other aspects, the animal waste product can first be contacted with a liquid, such as, for example, water, to dilute the animal waste and facilitate improved contact with an acid or solution thereof. In one aspect, an animal manure can be contacted, for example, sprayed, with an aqueous citric acid solution to lower the pH to a desirable value and to curtail volatilization of ammonia containing compounds. Any suitable form and/or concentration of a pH adjusting agent can be utilized, and one of skill in the art could readily determine an appropriate pH adjusting agent, concentration, and method of delivery for a particular animal waste product. In one aspect, an aqueous 50 wt. % solution of citric acid can be contacted with the animal manure or diluted slurry thereof. The mixture of acid and animal manure can be mixed, for example, by stirring or agitation, for a period of time ranging from, for example, about 5 minutes to about 60 minutes. In various aspects, the use of citric acid can produce ammonium citrate, a stable product that sequesters the free ammonia previously present in the animal manure.

In yet another aspect, a slurry of animal manure can be contacted with steam to maintain a slurry temperature of from about 30° C. to about 70° C., from about 50° C. to about 70° C., or from about 60° C. to about 70° C. In other aspects, a slurry can be aerated without the addition of steam. In one aspect, steam is used to adjust the temperature of the pH adjusted animal manure or slurry thereof to a value of from about 30° C. to about 35° C., such that mesophilic bacteria can begin to decompose organic matter. In other aspects, the temperature of a slurry can be adjusted via other traditional means, for example, external or immersion heaters, instead of using steam.

The animal waste product, either prior to, during, or subsequent to any pH adjustment, if needed, can optionally be moved, for example, conveyed, to a tank or vessel for subsequent processing. In one aspect, the diluted and stabilized (i.e., pH adjusted) slurry of animal manure can be transferred from one vessel to another vessel using, for example, a cavity pump. Cavity pumps are commercially available and are well-suited to moving slurries containing materials such as stones, feathers, wood chips, etc. A transfer line containing the slurry can optionally be directed to a vibratory screen, for example, vibrating in a vertical axial mode or in a horizontal cross mode, having appropriate sized holes to ensure that materials larger than about 0.125 inches can be excluded from the slurry stream.

In other aspects, an animal waste product, after pH adjustment, can be aerated to remove odorous compounds and to maintain an aerobic environment. In one aspect, a slurry of diluted and stabilized (i.e., pH adjusted) animal manure, such as, for example, chicken manure, can be placed in a vessel and aerated by sparging the slurry with air. In another aspect, the pH of a slurry comprising a diluted and stabilized animal manure can be maintained at a level of from about 3 to about 7, from about 5 to about 6, or at any of the pH ranges described above with respect to treatment with an acid, during aeration. In various aspects, the duration of an aeration step can vary, provided that aerobic conditions are maintained throughout the process.

In one aspect, during and/or subsequent to aeration, the slurry containing animal manure can be heated via injection of steam to a temperature of from about 50° C. to about 80° C., or from about 60° C. to about 70° C. In one aspect, water can be added, if needed, to adjust or maintain the moisture content of the slurry to a level of from about 80 wt. % to about 98 wt. % water; from about 85 wt. % to about 98 wt. %; or from about 90 wt. % to about 98 wt. %. In another aspect, water can be added, if needed, to adjust or maintain the moisture content of the slurry to a level of at least about 80 wt. %, at least about 85 wt. %, at least about 90 wt. %, at least about 92 wt. %, at least about 94 wt. %, at least about 96 wt. %, or at least about 98 wt. %. In yet another aspect, the moisture content can be adjusted or maintained such that aerobic conditions are maintained in the slurry.

Once a desired moisture or liquid level has been obtained, for example, via addition of water and/or nutrient enriched liquid, the resulting aqueous mixture can optionally be allowed to remain in contact for a period of time to facilitate the breakdown of organic matter in the manure. In one aspect, the aqueous mixture can be allowed to stand for a period of time without mixing. In another aspect, the aqueous mixture can be mixed, for example, via stirring, shaking, or other suitable means, for a period of time. In another aspect, the aqueous mixture can be aerated or sparged with air during all or a portion of a period of time. In another aspect, aerobic conditions are maintained are maintained during the entire period of time so as to prevent the growth of anaerobic bacteria. It should be noted that, even when aerobic conditions are maintained, it is possible to have small and/or localized concentrations of anaerobic bacteria remaining present in a sample. The present invention is not intended to require that no anaerobic bacteria are present, but rather that aerobic conditions are maintained that foster and promote the growth of aerobic bacteria. In another aspect, aeration of the animal manure containing slurry can continue for a period of time from about 2 hours to about 48 hours, for example, about 2, 3, 4, 5, 6, 8, 10, 12, 14, 16, 18, 20, 24, 28, 32, 36, 40, 44, or 48 hours. In other aspects, the slurry can be aerated for a period of time less than about 2 hours or greater than about 48 hours, and the present invention is not intended to be limited to any particular time period for aeration. In another aspect, the slurry can be aerated for a period of time up to about 4 hours.

In one aspect, the resulting slurry after aeration and optional contact with steam can be subjected to a sterilization step to kill pathogens present in the slurry. In one aspect, an aerated, stabilized slurry can be used as an organic fertilizer product, without any subsequent treatment steps. In other aspects, an aerated, stabilized slurry can be subjected to one or more subsequent treatment steps, such as, for example, a filtration step to remove suspended solids. In yet other aspects, such a slurry can be subjected to one or more steps, as described herein.

Separation

In one aspect, any suspended solids present in the slurry stream, after pH and temperature adjustment, can be removed, for example, via filtration or any other mechanical means. In various aspects, one or more of mechanical screening, microfiltration, electro coagulation, clarification, or a combination thereof, can be used to remove suspended solids from the slurry. In another aspect, a settling tank can be used to allow particles, sediments, and solids to gradually sink due to gravity. In another aspect, a centrifuge, such as, for example, a decanter centrifuge can be used to provide a continuous separation of liquids and solids.

When subjected to the forces of a decanter centrifuge, denser solid particles are pressed outwards against a rotating bowl wall, while a less dense liquid phase forms a concentric inner layer. Dam plates can be used to vary the depth of the liquid (i.e., the pond) as required. In such an aspect, sediment formed by the solid particles is continuously removed by a screw conveyor, which rotates at a different speed than the bowl. As a result, solids are gradually "ploughed" out of the pond and up a conical "beach". The centrifugal force compacts the solids and expels the surplus liquid. The dried solids then be discharged from the bowl, and the clarified liquid phase can overflow the dam plates situated at the opposite end of the bowl. Baffles within the centrifuge casing can direct the separated phases into flow paths and prevent cross-contamination. The speed of the screw conveyor can also be automatically adjusted by use of the variable frequency drive (VFD) in order to adjust to compensate for variations in the solids load.

In another aspect, separation of solids and liquids, for example, via a decanter centrifuge, can be performed in a manner so as to selectively remove one or more nutrients from either the solid or the liquid phase. In one aspect, a decanter centrifuge can continuously separate solids and liquids and can remove all or a portion of phosphorus and/or phosphorus containing compounds from, for example, the liquid portion of the material. In one aspect, a liquid, such as, for example, a thixotropic liquid from a bioreactor can be centrifuged at a temperature of from about 50° C. to about 95° C., for example, about 50, 55, 60, 65, 70, 75, 80, 85, 90, or 95° C.; from about 60° C. to about 95° C.; from about 60° C. to about 80° C.; from about 60° C. to about 70° C.; or from about 60° C. to about 65° C. In one aspect, centrifuging an animal waste material at temperatures of from about 65° C. to about 95° C. can result in more efficient separation, wherein the solids (e.g., cake) portion has a lower moisture content and the liquid centrate portion exhibits improved quality and requires less filtration or polishing downstream. In another aspect, material, such as, for example, a thixotropic liquid or a slurry comprising solid and liquid animal waste, can be fed to a decanter centrifuge at a rate of from about 5 gallons per minute to about 25 gallons per minute, for example, about 5, 6, 7, 8, 9, 10, 11, 12, 13, 14, 15, 16, 17, 18, 19, 20, 21, 22, 23, 24, or 25 gallons per minute. In other aspects, the temperature and/or feed rate of a centrifuge can vary, and the present invention is not intended to be limited to any particular temperature or feed rate conditions. In one aspect, a centrifuge, such as, for example, a decanter centrifuge, can selectively remove one or more chemicals or nutrients from an animal waste material. In another aspect, a decanter centrifuge, operated, for example, at the temperatures and feed rates described above, can selectively remove phosphorus from an animal waste sample. In various aspects, a decanter centrifuge can selectively remove from about 25 wt. % to about 90 wt. % of phosphorus present in an animal waste material; from 30 wt. % to about 80 wt. % of phosphorus, from about 40 wt. % to about 70 wt. % of phosphorus, or about 50 wt. % of phosphorus. In yet another aspect, a decanter centrifuge can selective remove at least about 30 wt. %, at least about 40 wt. %, at least about 50 wt. %, at least about 60 wt. %, at least about 70 wt. %, or at least about 80 wt. % of phosphorus from an animal waste material. In still other aspects, the addition of one or more additives, such as, for example, flocculants, polymers, or the like, can facilitate even higher levels of phosphorus removal. Thus, in one aspect, the methods described herein can provide an organic fertilizer product have a controlled or predetermined phosphorus level. Such fertilizer products can be useful in preventing the oversaturation of phosphorus materials in certain soils. In still other aspects, the use of a centrifuge, such as, for example, a decanter centrifuge, to selectively remove one or more chemical compounds or nutrients, such as, for example, phosphorus, as described above, can be performed as a standalone procedure, without the need to treat with acid, heat, aerate, filter, sterilize, or subject to an autothermal thermophilic aerobic bioreaction.

In one aspect, the solids stream emanating from a decanter centrifuge can be processed in a granulator system. Such a granulator system can comprises a rotary drum agglomerator. An overall system can comprise a reactor where dewatered solids from a decanter centrifuge are blended with fertilizer enhancing chemicals as well as agglomeration enhancers. In one aspect, agglomeration enhancers can comprise molasses derived from sugarcane or sugar beet processing. In another aspect, agglomeration enhancers can comprise lignins, for example, derived as a byproduct from papermills. In other aspects, an agglomeration enhancer, if used, can comprise any other suitable material for agglomerating solids for use as a fertilizer product. In one aspect, the enhanced solids can be further blended in a paddle mixer to optimize homogeneity. This product can then be directed into a rotary drum agglomerator for a final granulation and dehydration step.

In various aspects, a rotary drum agglomerator can be internally heated using, for example, a fuel-air combustion system. The hot gases are directed inside the rotary drum and the temperatures and residence times are maintained such that the final product is free of microorganisms and pathogens. Consequently, the final product can be defined as a sterile fertilizer solid. In order to maintain sterility, a sufficient amount of residence time is maintained in the presence of hot air so that the moisture content of the sterile product is maintained below about 12%. The resulting stream can then be directed to an appropriate packaging protocol that can range from loading the sterile fertilizer solids into trucks, super sacks or bags, as appropriate for current market conditions.

Autothermal Thermophilic Aerobic Bioreaction

In various aspects, the separated liquid phase, for example, from a decanter centrifuge, can be subjected to a first stage of an aerobic bioreactor. In one aspect, such a bioreactor can provide an autothermal thermophilic aerobic bioreaction (ATAB), an exothermic process where a stream, such as, for example, a liquid stream from a decanter centrifuge, is subjected to temperatures greater than about 55° C. and hydraulic retention times of from about 2 to about 18 days. In one aspect, an autothermal thermophilic aerobic bioreactor can provide a self-sustaining bioreaction that can maintain waste material temperatures from about 30° C. to about 70° C., or from about 60° C. to about 70° C.

In various aspects, organic solids can be degraded, and the heat released during microbial degradation can maintain thermophilic temperatures within the mixture. In another aspect, autothermal thermophilic aerobic bioreaction can produce a biologically stable product while reducing both sludge mass and volume. It is important to note that aerobic microbial degradation of organic matter, such as animal waste, will not produce chemical compounds known to be detrimental to plant growth. In contrast, anaerobic microbial degradation processes are known to produce noxious and/or phytotoxic compounds, unsuitable for use in fertilizer products.

In another aspect, thermophilic digestion can occur over a temperature range of from about 45° C. to about 70° C. In some cases, for reactors receiving high biodegradable loading, hyper thermophilic conditions with temperatures exceeding 70° C. can be present, and the present invention is not intended to be limiting to any particular thermophilic temperature conditions; however, hyper thermophilic conditions are typically unsuitable for optimal solids digestion. On the other hand, at lower temperatures ranging from about 10° C. to about 35° C., mesophilic conditions predominate. These mesophilic conditions can result in a distinctly different type of digestion reaction methodology. Given the optimal thermophilic digestion range, thermofiles whose physiological nature and lifestyle is probably a bacterial grouping comparable to that which would be found within composting biomass. Conventional compositing techniques can take multiple months to complete and the resulting end products are not easy to handle liquids. In addition, conventional composting techniques also require large amounts of space and frequent turning to insure sufficient aeration and temperature uniformity. Conventional composting techniques require months to cure the composting material and get rid of substances that can retard plant growth. Conventional composting techniques can also leave significant quantities of pathogens present in the compost material. In still other aspects, conventional composting techniques using materials having a carbon to nitrogen ratio below about 20:1, such as, for example, chicken manure, typically release significant quantities of nitrogen. Thus, conventional composting techniques cannot retain beneficial nitrogen nutrients in, for example, chicken manure, without the addition of other substances. In contrast, the methods of the present invention retain all or substantially all of the nitrogen nutrient present in the chicken manure and can release these nitrogen nutrients quickly upon use as a fertilizer.

Thus, in one aspect, it can be desirable to maintain thermophilic conditions for an extended period of time. The use of various temperature controlling means, such as, for example, steam, immersion heaters, jacket heaters, refrigerant coils, ice baths, can be utilized to ensure that thermophilic conditions are maintained.

In one aspect, a challenge in maintaining aerobic thermophilic conditions is to keep the process sufficiently aerobic by meeting or exceeding the oxygen demand while operating at the elevated temperature conditions of between about 45° C. and about 70° C. One reason for this difficulty is that as the process temperature increases, the saturation value of the residual dissolved oxygen decreases. Another challenge is that the activity of the thermophilic micro-organisms increases within increasing temperatures resulting in increased oxygen consumption by the micro-organisms. Because of the above conundrum, greater amounts of oxygen must be imparted into the biomass containing solutions to maintain ideal reaction (e.g., decomposition) conditions. Thus, in one aspect, aerobic thermophilic conditions are maintained via continuous adjustment of air or oxygen levels and continuous adjustment of temperature conditions.

In one aspect, oxygen can be imparted using a jet aeration device. Jet aerators utilize two-phase jet nozzles to supply atmospheric oxygen to chemical and biological treatment processes. Special process benefits can include high oxygen transfer efficiency, independent control of oxygen transfer and mixing, superior mixing, capital and energy savings, and reduced off-gas. These combine large volumes of recirculated liquid with low pressure air in a proprietary mixing nozzle. Recirculated liquid can be pumped through the inner, primary nozzle, creating a high velocity liquid stream, while air is fed into the secondary, outer nozzle. The high velocity liquid stream shears the air into a turbulent, fine dispersion of gas and liquid. This device comprises of an air header having a multiplicity of openings/jets through which a gas transported through the air header exits. Simultaneously, a liquid header running parallel to the air header and having the same multiplicity of openings through which the biosolids containing solution is pumped and exits through the openings.

In one aspect, an oxygen-rich gas/liquid plume can be then discharged out of the secondary nozzle, entraining the surrounding liquid. The gas/liquid plume has both horizontal and vertical energy components and provides intense mixing of the basin.

In addition to the vertical component caused by bubble rise, the recirculated liquid can impart a horizontal component of mixing energy. Full mixing of the basin can thus be achieved without the need for full floor coverage.

In addition to the efficiency inherent with a fine bubble dispersion of a gas into a liquid, the turbulent nature of jet aeration produces constant renewal of the gas/liquid interface, further facilitating oxygen transfer. The alpha factor is a relative measure of oxygen transfer performance in process wastewater vs. clean water. This constant surface renewal of the gas/liquid interface results in alpha factors that are higher when compared to most other fine bubble diffuser technologies.

In one aspect, a well configured operating system should maintain ambient dissolved oxygen levels of approx. 4 mg/l and 6 mg/l, for example, about 4, 4.2, 4.4, 4.6, 4.8, 5, 5.2, 5.4, 5.6, 5.8, or 6 mg/l. In other aspects, the bioreaction should maintain a dissolved oxygen level of at least about 1.5 mg/l, at least about 2 mg/l, at least about 3 mg/l, or at least about 4 mg/l. It should be noted that the saturation level of oxygen in an aqueous solution between about 45° C. and about 70° C. is from about 4 mg/l to about 6 mg/l. In another aspect, the dissolved oxygen level should be maintained at a level of at least about 30% of the saturation level, at least about 50% of the saturation level, or at least about 75% of the saturation level. Highly active thermophiles maintain a vigorous oxygen uptake that is normally observed in mesophilic digestion units and consequently, the operating dissolved oxygen level should be kept low in order to maintain an appropriate mass transfer gradient. Operationally, one can readily picture situations where active thermophiles create a low dissolved oxygen environment where that type of measurement becomes irrelevant. Aerobic conditions at this stage of the treatment process can help strip the waste material of any undesirable compounds which can be present. In one aspect, such undesirable compounds, such as, for example, H2S and/or mercaptans, can be present from previous anaerobic activity prior to treatment of the animal waste, for example, storage of waste prior to treatment.

In one aspect, the aerated slurry stream can be sent directly to the first stage of an aerobic bioreactor. If needed, the contents can be heated by direct steam injection to an optimum temperature of between about 50° C. and about 75° C. It should also be noted that the injection of air to maintain a desirable dissolved oxygen level can also adjust the temperature by, for example, evaporative or direct cooling. The contents of the bioreactor can then be mixed using a recirculation pump. Air can be injected into the tank to maintain an aerobic environment. Water can also be added to maintain a moisture concentration of between about 80 wt. % and about 98 wt. % water. Residence time in the bioreactor can depend upon solids loading, temperature, air flow and addition of any additives to create specific formulations. In some aspects, other biomass materials, such as, for example, hydrolyzed feather meal, can be added to the bioreactor. Such an addition can change the residence time necessary in the bioreactor. In one aspect, residence time in the first stage of the bioreactor can be between about 1 day and about 18 days, for example, about 1, 2, 3, 4, 5, 6, 7, 8, 9, 10, 11, 12, 13, 14, 15, 16, 17, or 18 days; or preferably less than about 5 days, for example, about 1, 2, 3, 4, or 5 days. After a set amount of time in the first stage, a predetermined amount of material can be sent to the second stage of a bioreactor for final stabilization.

In another embodiment the aerated slurry is first centrifuged, and the resultant colloidal suspension can be sent to the first stage aerobic bioreactor. If needed, the contents can be heated by, for example, direct steam injection to a temperature of from about 50° C. and about 75° C. The contents of the bioreactor can optionally be mixed, for example, in a continuous manner, using a recirculation pump. Air can also be injected into the tank to maintain an aerobic environment. It should be noted that in one aspect, an aerobic environment should be maintained at all times during the process. Water can also be added to maintain the proper moisture concentration of between about 80 wt. % and about 98 wt. % water. Residence time in the bioreactor can depend upon solids loading, temperature, air flow and addition of any additives to create specific formulations. In some aspects, other biomass materials, such as, for example, hydrolyzed feather meal, can be added to the bioreactor. Such an addition can change the residence time necessary in the bioreactor. In one aspect, residence time in the first stage bioreactor is between about 1 day and about 18 days, preferably less than about 5 days. After a set amount of time in the first stage, a predetermined amount of material can be sent to the second stage bioreactor for final stabilization.

In other aspects, the second stage of an autothermal thermophilic aerobic bioreactor can further aerate a waste material. In one aspect, the conditions of a second stage bioreactor can be the same as or substantially similar to the first stage bioreactor. In other aspects, the conditions (e.g., temperature, dissolved oxygen level, etc.) can vary from those of the first stage bioreactor. In one aspect, the second stage of a bioreaction can facilitate further degradation of volatile solids or the addition of substances that can produce a product having greater nutrient values. In another aspect, a second stage can be useful to ensure prolonged contact time at the desirable temperature and oxygen levels for any given portion of the material being treated. In another aspect, given the continuous nature of the bioreaction system, a second stage can prevent the inadvertent passage of untreated or undigested waste material through the bioreaction system.

Sterilization

All or any portion of the liquid and/or solid product stream can optionally be subjected to a sterilization step to remove and/or kill all or a portion of pathogens that can be present in the animal manure. It should understand that the specific pathogens that can be present can vary depending upon the animal and originating facility, along with the handling history of the animal waste. A sterilization step, if performed, can utilize any suitable means for removing and/or killing pathogens.

In one aspect, the contents of the second stage bioreactor can be pumped continuously, for example, using a high pressure pump that is capable of generating discharge pressures of up to 75 psig, into a sterilizer, such as, for example, a continuous sterilizer. In one aspect, sterilization can be achieved by applying heat and optionally pressure.

The degree of sterilization is commonly expressed by multiples of the decimal reduction time D denoting the time needed to reduce the initial number NO to one tenth ($10^{-1}$) of its original value. Then the number of microorganisms N after sterilization time t is given by $N/N0=10^{(-t/D)}$. D is a function of sterilization conditions and varies with the type of microorganism, temperature, water activity, pH etc. For steam sterilization, temperature (in ° C.) is typically given as index. For sterilization, a reduction by one million ($10^{-6}$) is minimally required with six times D. Theoretically, the likelihood of survival of an individual microorganism is never zero.

A widely used method for heat sterilization is a plug flow tubular unit sometimes called a hairpin sterilizer. Such sterilizers commonly use steam heated to from about 121° C. to about 134° C. (i.e., about 250° F. to about 273° F.). To achieve sterility, a holding time of at least 15 minutes at about 121° C. (i.e., about 250° F.) at 100 kPa (i.e., 15 psi), or 3 minutes at 134° C. (i.e., 273° F.) at 100 kPa (15 psi) can be used.

According to this method, the product is indirectly heated to a temperature of from about 90° C. to about 100° C. and directly heated using steam injection up to temperatures preferably ranging from about 120° C. to about 135° C.

Direct contact heat transfer is conducted by injecting precisely metered amounts of steam into the process fluid. Injecting this steam directly results in a rapid heat transfer and very efficient energy usage. It should be noted that this direct steam injection method eliminates what is commonly referred to as the "heat transfer barrier". This steam heating protocol can be 100% thermally efficient because both the sensible and the latent heat of steam are utilized.

In one aspect, steam injection in this application can be conducted by external modulation using an appropriately sized control valve that throttles steam as needed. This control valve can readily vary the velocity of steam injection into the process liquid as well as the pressure relationship between steam and the process liquid. In another aspect, steam leaving the control valve can be directed into the process fluid using a sparging nozzle with multiple perforations to optimize steam dispersion.

In various aspects, the present invention relates to a method for continuous sterilization and an arrangement for carrying through this method. The product can be preheated by indirect heating and then heated to sterilization temperatures of between about 115° C. to about 150° C. by means of steam injected directly into the flow of the product by means of a throttling valve. In one aspect, the sterilizer can be insulated, whereas in another aspect, it can be jacketed. In another aspect, the product can be cooled after sterilization by, for example, isenthalpic depressurization. In such an aspect, the depressurized sterilized liquid product stream results in an environment where the water vapor emanates out of the depressurized product. In another aspect, heat removed from the liquid product stream during a cooling step, for example, using a heat exchanger, can be used to heat another portion of the manure or product stream, for example, an incoming liquid stream to a sterilizer.

In other aspects, a sterilization step, if performed, can comprise exposing a product stream to ultraviolet radiation for a period of time sufficient to kill all or a portion of the pathogens present therein. In another aspect, a sterilization step, if performed can comprise contacting the product stream with a chemical agent, such as, for example, chlorine dioxide, for a period of time sufficient to kill all or a portion of pathogens present therein. In other aspects, a sterilization step, if performed, can comprise other techniques or a combination of two or more techniques recited herein or known in the art to kill pathogens. A chemical agent, if utilized, can comprise any agent suitable for reducing or killing pathogens. In one aspect, a chlorine based agent can be used. In another aspect, a solution comprising chlorine dioxide can be used. In yet another aspect, a material, such as sodium hypochlorite, can be used. A chemical agent, if used, can comprise a solid and/or a liquid and can have any concentration suitable for killing pathogens in an animal waste product. In still other aspects, no chemical or chlorine based chemical agents are used to sterilize all or a portion of a product stream.

Offgas Treatment

In one aspect, the depleted air stream leaving the primary aeration tank can be directed to a biofilter. In another aspect, the depleted air stream exiting the first stage ATAB and the depleted air stream leaving the second stage ATAB can be combined. In one aspect, both streams can contain significant amounts of ammonia and water vapor. In such an aspect, the combined streams can be directed through a condenser that can optionally be water cooled. The condensate emanating from this condenser can then be directed to an ammonia water receiver. In another aspect, due to the significant amount of saturated water vapor, virtually all the ammonia can be solubilized in the condensate. The ammoniacal water can be continuously pumped out and directed into a base product receiver or formulated product receiver depending upon the specific formulations desired.

In another aspect, the depleted air and the air from stream are both combined and directed to a biofilter.

In one aspect, the biofilter is a device that uses microbes to consume pollutants from a contaminated air stream. In one aspect, the biofilter is a rectangular box that contains an enclosed plenum at the bottom with a support rack above the plenum. On top of the support rack is a bed of media where the media is comprised of peat, bark, etc. In one aspect, the support rack can be perforated to enable the air from the plenum to move into the bed media to contact the microbes therein. The bed can be maintained at a temperature ranging from about 60° F. to about 100° F., or in the range of from about 80° F. to about 90° F. It should be noted that air streams directed to the biofilter can be saturated with water, as microbes need moisture to survive and moisture creates a biofilm that absorbs pollutants from the air stream to be assimilated by microbes. Pollutants are the main source of food and energy for the microbes, but they can additionally require micronutrients for sustenance. These micronutrients can typically be provided via the decay of organic bed media.

In one aspect, a biofilter, if utilized, can perform best when the pH ranges from about 6 to about 8, for example, about 6, 7, or 8. When compounds such as hydrogen sulfide, organic sulfurs, halogens, etc. decompose, they result in the production of acids that could lower pH and eventually destroy microbes. In one embodiment, this is mitigated by the addition of oyster shells into the bed media wherein the shells will slowly decompose along with the organic bed media. The bed media in the biofilter can eventually or periodically be replaced. A biofilter, if present, can comprise one or more substrates, each containing the same or different bacteria populations, that can scrub air as it passes through the biofilter, removing contaminants before the air is vented to atmosphere. In another aspect, each substrate and bacteria can be selected to target one or more specific chemical compounds.

Product Receiving Section

In one aspect, the product stream from an ammonia water receiver can be directed to a base product receiver. Such a base product receiver can be equipped with an agitator that can maintain the colloidal components of the liquid stream in the homogeneous suspension. Periodically, the contents of the base product receiver can be pumped out into appropriate tanks for shipment to the marketplace.

In another embodiment, product stream can be directed to a formulated product receiver. In one aspect, one or more additional nutrients can be added to a product stream. In another aspect, one or more organic nutrients can be added to a product stream. In one aspect, sodium nitrate or an organic sodium nitrate, such as, for example, Chilean sodium nitrate, can be introduced into the product line leading to the formulated product receiver or the formulated product receiver itself. In another aspect, the quantity of the sodium nitrate, if used, can be predetermined to ensure that the nitrogen content of the formulated product is appropriate to the category of fertilizer product being made. Another aspect of the invention enables the introduction of Single Super Phosphate (SSP) into the product line leading to the formulated product receiver or the formulated product receiver itself. The quantity of SSP, if used, can be predetermined to ensure that the phosphorus component of the formulated product is appropriate to the category of fertilizer product being made. In another aspect, an organic sodium nitrate, single super phosphate, or other additive nutrients can be introduced into the formulated product receiver by, for example, gravimetric solid feeder protocol or in a concentrate form, whichever is appropriate for the application.

In yet another aspect, the formulated product receiver can be equipped with an agitator to ensure that the formulation maintains the appropriate homogeneity. In one aspect, the contents of the base product receiver can be periodically be conveyed to appropriate vessels or storage areas for ultimate shipment to the marketplace.

Organic Fertilizer Products

In various aspects, a liquid organic fertilizer product prepared by the methods of the present disclosure can contain suspended solids. In one aspect, all or a portion of suspended solids in the liquid organic fertilizer product can be separated by, for example, pumping the liquid through a 200 mesh screen. The separated solids can optionally be conveyed to an aerobic reactor for subsequent treatment, as described above.

In one aspect, a liquid or solid organic fertilizer product prepared by the methods described herein can meet all current USDA requirements for an organic fertilizer. In another aspect, an organic fertilizer product produced by the methods described herein can contain no or substantially no phytotoxins or other plant growth retarding substances. In another aspect, a liquid or solid organic fertilizer product prepared by the methods described herein can comprise no or substantially no pathogens. In one aspect, a liquid or solid organic fertilizer product can have no detectable pathogens as measured by conventional means used in organic fertilizer products.

In an exemplary aspect, an organic liquid fertilizer product prepared by the methods of the present invention can exhibit a composition as illustrated in Table 2, below.

TABLE 2

Composition of Exemplary Liquid Organic Fertilizer Product

| NUTRIENTS | | Analysis |
| --- | --- | --- |
| Nitrogen | % | 1-3 |
| Phosphorus | % | <0.5 |
| Potassium | % | 1-3 |
| Sulfur | % | >0.2 |
| Calcium | % | 1-2 |
| Magnesium | % | 1-2 |
| Micronutrients | | |
| Zinc | ppm | >100 |
| Iron | ppm | >300 |
| Manganese | ppm | >100 |
| Copper | ppm | <20 |
| Boron | ppm | <20 |

In other aspects, a liquid organic fertilizer product can comprise a colloidal suspension. In one aspect, a liquid organic fertilizer product can be capable of being sprayed through a nozzle, for example, a 200 mesh nozzle. In other aspects, a liquid organic fertilizer product can have a brown color. In another aspect, a liquid or solid organic fertilizer product can be odorless or can have a slight pungent odor. In still another aspect, a liquid or solid organic fertilizer product does not exhibit an odor typically associate with animal feces.

In another aspect, a liquid organic fertilizer product can have pH of from about 4 to about 7, for example, about 4, 4.5, 5, 5.5, 6, 6.5, or 7; or from about 5 to about 6, for example, about 5, 5.1, 5.2, 5.3, 5.4, 5.5, 5.6, 5.7, 5.8, 5.9, or 6. In still another aspect, a liquid organic fertilizer product can be non-corrosive. In still another aspect, a liquid organic fertilizer product can be compatible with conventional agricultural spray equipment.

In other aspects, a solid organic fertilizer prepared by the methods of the present disclosure can comprise each of the primary, secondary, and micro-nutrients described herein, and can have a moisture content of less than about 20 wt. %, or less than about 12 wt. %. In another aspect, such a solid organic fertilizer product can be in a granulated or pelletized form for distribution and eventual use as a fertilizer.

It should be understood that the methods and devices described herein are intended to be exemplary, and the present invention is not intended to be limited to any particular steps or components. Accordingly, any individual steps, devices, or combinations thereof can be present or not present in various aspects of the invention. For example, the methods and devices of the present disclosure can lack one or more components, but are still intended to be covered by this disclosure.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

The present invention can be described in one or more of the follow aspects or combinations thereof.

Aspect 1: A process for manufacturing an organic fertilizer product, the process comprising: providing an animal waste composition comprising an animal waste, contacting the animal waste composition with an acid to produce a stabilized animal waste composition, aerating the animal waste composition, and separating a solid component and a liquid component of the stabilized animal waste composition.

Aspect 2: The process of aspect 1, wherein the animal waste composition comprises chicken manure.

Aspect 3: The process of aspect 1, wherein the animal waste composition comprises poultry litter, broiler litter, layered manure, or a combination thereof.

Aspect 4: The process of aspect 1, wherein the animal waste composition comprises a manure slurry.

Aspect 5: The process of aspect 1, wherein the animal waste composition has a moisture content of from about 20 wt. % to about 95 wt. %.

Aspect 6: The process of aspect 1, wherein the animal waste composition has a moisture content of at least about 80 wt. %.

Aspect 7: The process of aspect 1, wherein contacting further comprises adjusting the moisture content of the animal waste composition to a level of at least about 75 wt. %.

Aspect 8: The process of aspect 1, wherein contacting further comprises adjusting the moisture content of the animal waste composition to a level of at least about 80 wt. %.

Aspect 9: The process of aspect 1, wherein contacting further comprises adjusting the moisture content of the animal waste composition to a level from about 80 wt. % to about 98 wt. %.

Aspect 10: The process of aspect 1, wherein contacting further comprises adjusting the moisture content of the animal waste composition via the addition of water, a nutrient enriched liquid, or a combination thereof.

Aspect 11: The process of aspect 1, wherein the acid comprises citric acid.

Aspect 12: The process of aspect 1, wherein the acid comprises an aqueous solution of citric acid.

Aspect 13: The process of aspect 1, wherein the acid comprises a 50 wt. % aqueous solution of citric acid.

Aspect 14: The process of aspect 1, wherein contacting comprising an addition of acid sufficient to adjust the pH of the animal waste composition to a value of from about 4 to about 7.

Aspect 15: The process of aspect 1, wherein contacting comprising an addition of acid sufficient to adjust the pH of the animal waste composition to a value of from about 5 to about 7.

Aspect 16: The process of aspect 1, wherein contacting comprising an addition of acid sufficient to adjust the pH of the animal waste composition to a value of from about 6 to about 7.

Aspect 17: The process of aspect 1, wherein contacting further comprises heating the animal waste composition to promote the growth of mesophilic bacteria.

Aspect 18: The process of aspect 1, wherein contacting further comprises heating the animal waste composition to a temperature of from about 30° C. to about 70° C.

Aspect 19: The process of aspect 1, wherein contacting further comprises heating the animal waste composition to a temperature of from about 30° C. to about 35° C.

Aspect 20: The process of aspect 1, wherein contacting further comprises heating the animal waste composition to a temperature of from about 50° C. to about 70° C.

Aspect 21: The process of aspect 1, wherein contacting further comprises heating the animal waste composition to a temperature of from about 60° C. to about 70° C.

Aspect 22: The process of aspect 1, wherein contacting further comprises heating the animal waste composition via injection of steam.

Aspect 23: The process of aspect 1, wherein after contacting and prior to aerating, the stabilized animal waste composition is transferred to an aeration vessel.

Aspect 24: The process of aspect 1, wherein after contacting and prior to aerating, the stabilized animal waste composition is filtered to remove stones, feathers, wood chips, or a combination thereof.

Aspect 25: The process of aspect 1, wherein aerating the stabilized animal waste composition comprises sparging with air or oxygen.

Aspect 26: The process of aspect 1, wherein a pH of the stabilized animal waste composition is maintained at a level of from about 3 to about 7 during aerating.

Aspect 27: The process of aspect 1, wherein a pH of the stabilized animal waste composition is maintained at a level of from about 4 to about 7 during aerating.

Aspect 28: The process of aspect 1, wherein a pH of the stabilized animal waste composition is maintained at a level of from about 5 to about 7 during aerating.

Aspect 29: The process of aspect 1, wherein a pH of the stabilized animal waste composition is maintained at a level of from about 6 to about 7 during aerating.

Aspect 30: The process of aspect 1, wherein an aerobic environment is maintained at all times during contacting and aerating.

Aspect 31: The process of aspect 1, wherein aerating comprises heating the stabilized animal waste composition to a temperature of from about 50° C. to about 80° C.

Aspect 32: The process of aspect 1, wherein aerating comprises heating the stabilized animal waste composition to a temperature of from about 60° C. to about 70° C.

Aspect 33: The process of aspect 1, wherein aerobic conditions are maintained throughout the process.

Aspect 34: The process of aspect 1, wherein conditions are maintained throughout the process sufficient to prevent the growth of anaerobic bacteria.

Aspect 35: The process of aspect 1, further comprising sterilizing the stabilized animal waste composition.

Aspect 36: The process of aspect 35, wherein sterilizing comprising heating the stabilized animal waste composition to a temperature sufficient to kill all or substantially all pathogens.

Aspect 37: The process of aspect 1, wherein separating comprises centrifuging the stabilized animal waste composition to separate solid and liquid components thereof.

Aspect 38: The process of aspect 1, wherein separating comprises a continuous separation of solid and liquid components.

Aspect 39: The process of aspect 1, wherein a temperature of from about 65° C. to about 95° C. is maintained during separating.

Aspect 40: The process of aspect 1, wherein separating comprises separating the solid component and liquid component of the stabilized animal waste composition using a decanter centrifuge.

Aspect 41: The process of aspect 1, wherein separating comprises selectively concentrating one or more nutrients in the solid component, the liquid component, or a fraction thereof.

Aspect 42: The process of aspect 1, wherein separating comprises selectively removing all or a portion of one or more nutrients from the solid component, the liquid component, or a combination thereof.

Aspect 43: The process of aspect 1, wherein at least about 30 wt. % of phosphorus present in the stabilized animal waste composition is selectively removed.

Aspect 44: The process of aspect 1, wherein the separated solid component is granulated.

Aspect 45: The process of aspect 1, wherein the separated solid component is contacted with an agglomeration enhancer.

Aspect 46: The process of aspect 1, wherein the separated solid component is dried to a moisture level of less than about 12 wt. %.

Aspect 47: The process of aspect 1, wherein the separated solid component is heated to a temperature sufficient to kill all or substantially all pathogens.

Aspect 48: The process of aspect 1, wherein separated solid component comprises a solid organic fertilizer product.

Aspect 49: The process of aspect 1, further comprising subjecting the separated liquid component and/or the solid component to an autothermal thermophilic aerobic bioreaction.

Aspect 50: The process of aspect 1, further comprising subjecting the separated liquid component and/or the solid component to a two stage autothermal thermophilic aerobic bioreaction.

Aspect 51: The process of aspect 49, wherein the autothermal thermophilic aerobic bioreaction comprises heating the stabilized separated liquid component to a temperature of at least about 45° C.

Aspect 52: The process of aspect 49, wherein the autothermal thermophilic aerobic bioreaction comprises heating the stabilized separated liquid component to a temperature of at least about 55° C.

Aspect 53: The process of aspect 49, wherein the autothermal thermophilic aerobic bioreaction comprises heating the stabilized separated liquid component to a temperature of from about 50° C. to about 80° C.

Aspect 54: The process of aspect 49, wherein the autothermal thermophilic aerobic bioreaction comprises heating the stabilized separated liquid component to a temperature of from about 50° C. to about 75° C.

Aspect 55: The process of aspect 49, wherein the autothermal thermophilic aerobic bioreaction comprises maintaining aerobic condition and a temperature suitable for the promotion of thermophilic bacteria for a period of time.

Aspect 56: The process of aspect 49, wherein the autothermal thermophilic aerobic bioreaction comprises maintaining a dissolved oxygen level in the separated liquid component of from about 4 mg/l to about 6 mg/l.

Aspect 57: The process of aspect 49, wherein the autothermal thermophilic aerobic bioreaction comprises maintaining a dissolved oxygen level in the separated liquid component of at least about 1.5 mg/l.

Aspect 58: The process of aspect 55, wherein the period of time comprises from about 1 day to about 18 days.

Aspect 59: The process of aspect 55, wherein the period of time comprises up to about 5 days.

Aspect 60: The process of aspect 49, wherein the autothermal thermophilic aerobic bioreaction comprises injection of air and/or oxygen using a jet aeration device to maintain aerobic conditions.

Aspect 61: The process of aspect 50, wherein each of a first stage and a second stage of the autothermal thermophilic aerobic bioreaction comprises maintaining aerobic conditions and a temperature sufficient to promote thermophilic bacterial for a period of time.

Aspect 62: The process of aspect 61, wherein the dissolved oxygen level and temperature of the separated liquid component are the same or substantially the same in each of the first stage and the second stage.

Aspect 63: The process of aspect 61, wherein the dissolved oxygen level and temperature of the separated liquid component in the second stage are different from the same in the first stage.

Aspect 64: The process of aspect 49, wherein the separated liquid component, after the first stage or the second stage of the autothermal thermophilic aerobic bioreaction, is subjected to sterilization to kill all or substantially all pathogens present therein.

Aspect 65: The process of aspect 49, wherein the separated liquid component, after the second stage of the autothermal thermophilic aerobic bioreaction, is subjected to sterilization to kill all or substantially all pathogens present therein.

Aspect 66: The process of aspect 64, wherein sterilization comprises heating the separated liquid component to a temperature of from about 120° C. to about 135° C.

Aspect 67: The process of aspect 64, wherein after sterilization, no detectable pathogens exist in the separated liquid component.

Aspect 68: The process of aspect 49, wherein an offgass from the first stage, the second stage, or a combination thereof from the autothermal thermophilic aerobic bioreaction can be treated with an ammonia-water receiver.

Aspect 69: The process of aspect 49, wherein an offgass from the first stage, the second stage, or a combination thereof from the autothermal thermophilic aerobic bioreaction can be treated a biofilter.

Aspect 70: The process of aspect 49, wherein the separated liquid component, after the autothermal thermophilic aerobic bioreaction, comprises an organic liquid fertilizer product.

Aspect 71: The process of aspect 70, wherein one or more additional nutrients can be contacted with the organic liquid fertilizer product.

Aspect 72: The process of aspect 71, wherein the one or more additional nutrients comprise organic nutrients.

Aspect 73: The process of aspect 71, wherein the one or more additional nutrients comprises organic sodium nitrate, single super phosphate, or a combination thereof.

Aspect 74: The process of aspect 70, wherein one or more biomass materials can be contacted with the organic liquid fertilizer product.

Aspect 75: The process of aspect 74, wherein the one or more biomass materials can comprise hydrolyzed feather meal.

Aspect 76: A solid organic fertilizer product resulting from the process of any of aspects 1-48.

Aspect 77: The solid organic fertilizer product of aspect 76, meeting United States Department of Agriculture requirements for an organic fertilizer.

Aspect 78: The solid organic fertilizer product of aspect 76, being free from or substantially free from pathogens.

Aspect 79: A liquid organic fertilizer product resulting from the process of any of aspects 1-75.

Aspect 80: The liquid organic fertilizer product of aspect 79, being free from or substantially free from pathogens.

Aspect 81: The liquid organic fertilizer product of aspect 79, meeting United States Department of Agriculture requirements for an organic fertilizer.

Aspect 82: The liquid organic fertilizer product of aspect 79, capable of flowing through a 200 mesh screen.

Aspect 83: The liquid organic fertilizer product of aspect 79, capable of being sprayed through a nozzle.

Aspect 84: The liquid organic fertilizer product of aspect 79, capable of being sprayed using conventional liquid agricultural equipment.

Aspect 85: The liquid organic fertilizer product of aspect 79, having a brown color.

Aspect 86: The liquid organic fertilizer product of aspect 79, having no unpleasant odor.

Aspect 87: The liquid organic fertilizer product of aspect 79, having no odor typically associated with animal feces.

Aspect 88: The liquid organic fertilizer product of aspect 79, having a pH from about 4 to about 7.

Aspect 89: The liquid organic fertilizer product of aspect 79, having a nitrogen concentration of from about 1 wt. % to about 3 wt. %, a phosphorus concentration of less than about 0.5 wt. %, and a potassium concentration of from about 1 wt. % to about 3 wt. %.

Aspect 90: The liquid organic fertilizer product of aspect 79, comprising a colloidal suspension.

EXAMPLES

Example 1

With reference to the figures, various exemplary aspects of the treatment methods described herein are detailed below. In one aspect, an exemplary block schematic of the process is illustrated in FIG. 1. The exemplary process illustrated in FIG. 1 comprises a prep tank into which chicken manure in the form of, for example, broiler litter and/or layer manure, is added. Water and a 50% aqueous solution of citric acid are added to adjust the moisture content of the chicken manure to a level of at least about 80 wt. % and to adjust the pH of the chicken manure to a value of from about 6 to about 7 to stabilize the waste and capture any resident ammonia as ammonium citrate.

The mixture is then conveyed to a primary aeration tank, where it is aerated to maintain aerobic conditions. The pH stabilized and aerated waste stream is then transferred to a centrifuge, such as, for example, a decanter centrifuge, wherein solids components are separated liquid components. The separated solid components are subsequently pelletized and dried to a moisture level of less than about 12 wt. %. The separated liquid components are transferred to the first stage of an aerobic bioreactor, wherein the liquid components are heated and sparged with air for a period of time to promote thermophilic bacteria and to maintain aerobic conditions. After completion of the first stage of the aerobic bioreactor, all or a portion of the liquid components can be transferred to the second stage of the aerobic bioreactor, wherein further heating and aeration are performed for a period of time. After completion of the second stage of the aerobic bioreactor, all or a portion of the liquid components can be transferred to a sterilizer, wherein the liquid can be heated to kill any pathogens remaining therein. After sterilization, the liquid components can be transferred to packaging or storage areas, and optionally can have additional nutrients, such as, organic nitrogen and/or phosphorus nutrients added thereto.

Example 2

Figure 2:
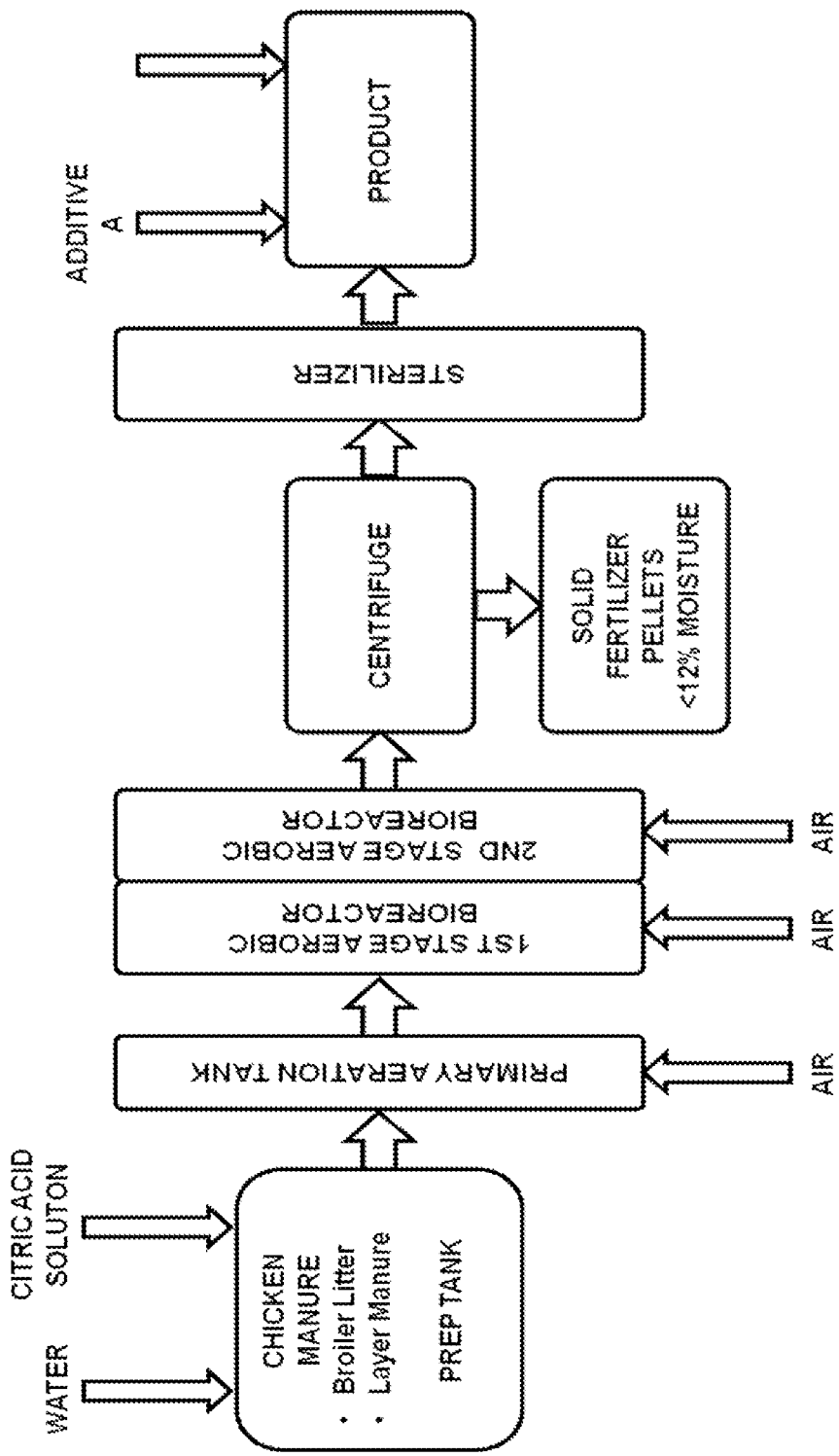
FIG. 2 is a schematic of an alternative exemplary process for manufacturing organic fertilizer products from animal manure, in accordance with various aspects of the present invention.

In another aspect, an alternative exemplary block schematic of the process is illustrated in FIG. 2. The exemplary process illustrated in FIG. 2 comprises a prep tank into which chicken manure in the form of, for example, broiler litter and/or layer manure, is added. Water and a 50% aqueous solution of citric acid are added to adjust the moisture content of the chicken manure to a level of at least about 80 wt. % and to adjust the pH of the chicken manure to a value of from about 6 to about 7 to stabilize the waste and capture any resident ammonia as ammonium citrate.

The mixture is then conveyed to a primary aeration tank, where it is aerated to maintain aerobic conditions. The pH stabilized and aerated waste stream can then be transferred to the first stage of an aerobic bioreactor, wherein the waste material is heated and sparged with air for a period of time to promote thermophilic bacteria and to maintain aerobic conditions. After completion of the first stage of the aerobic bioreactor, all or a portion of the waste material from the first stage of the bioreactor can be transferred to the second stage of the aerobic bioreactor, wherein further heating and aeration are performed for a period of time. After completion of the second stage of the aerobic bioreactor, all or a portion of the liquid components can be transferred to a centrifuge, such as, for example, a decanter centrifuge, wherein solids components are separated liquid components. The separated solid components are subsequently pelletized and dried to a moisture level of less than about 12 wt. %.

The separated liquid components can then be transferred to a sterilizer, wherein the liquid can be heated to kill any pathogens remaining therein. After sterilization, the liquid components can be transferred to packaging or storage areas, and optionally can have additional nutrients, such as, organic nitrogen and/or phosphorus nutrients added thereto.

Example 3

Figure 3:
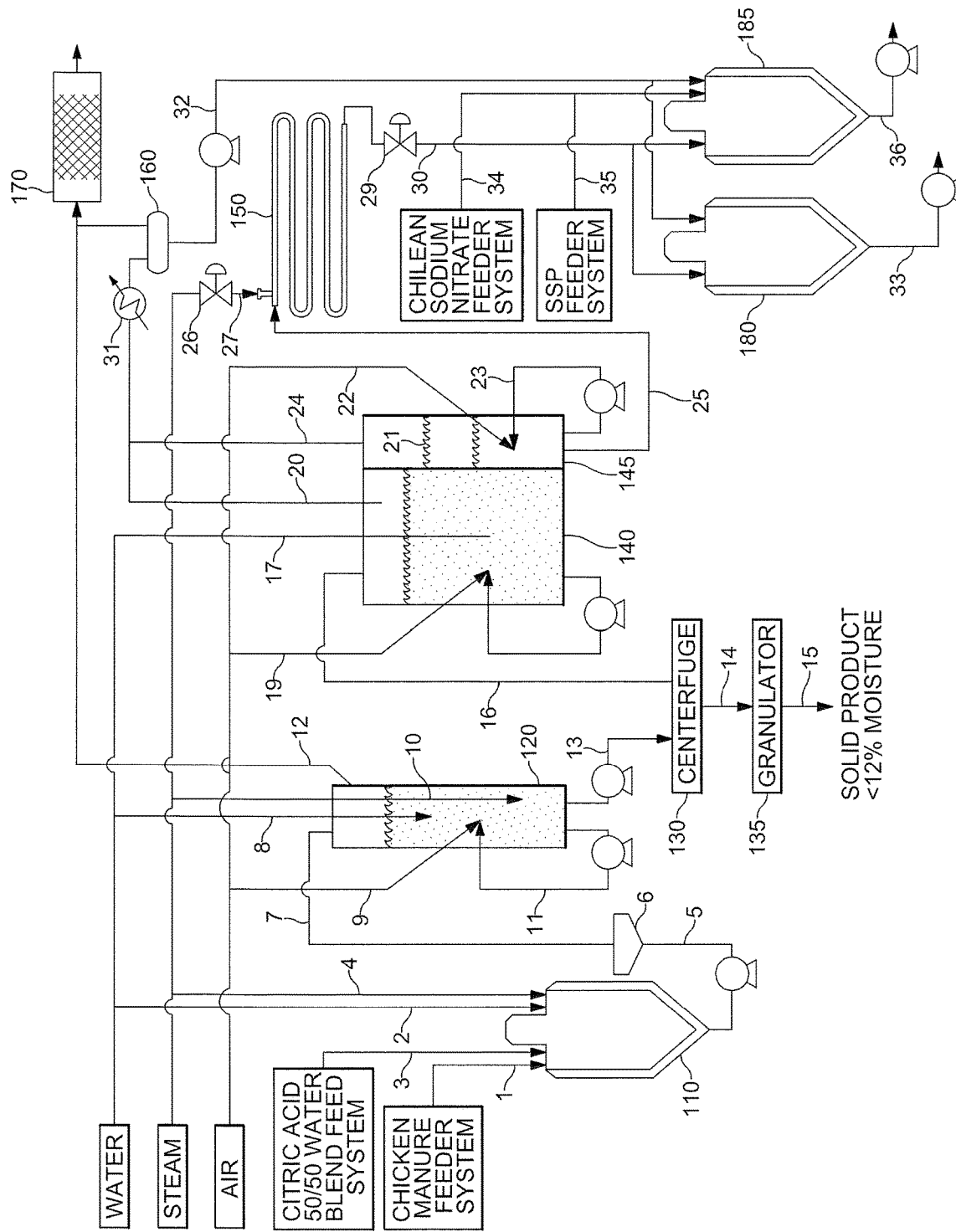
FIG. 3 is a schematic of an exemplary integrated facility for converting animal manure into liquid and solid organic fertilizer products.

FIG. 3 illustrates a detailed exemplary treatment process. In such an exemplary aspect, bulk waste product containing manure is delivered in bulk 1, generally by a tractor-trailer, dump truck, conveyor truck or the like, and transferred to a prep tank 110, wherein the waste product is sprayed with water 2 and an acid, such as an aqueous 50% solution of citric acid 3. The resulting mixture is transferred using a cavity pump 5 to a vibratory screen 6 to separate stones and other undesirable materials from the mixture. The mixture is then transferred 7 to a primary aeration tank 120, where the mixture is sparged with air 9, steam 10 is injected to raise the temperature of the mixture to about 65° C., and water 8 is optionally added. A recirculation pump 11 can optionally circulate material within the aeration tank. Gases from the aeration tank, such as, for example, sparged air, can be conveyed 12 to a biofilter 170 before being vented to atmosphere. Solids from the aeration tank can then be conveyed using a progressive cavity pump 13 to a decanter centrifuge 130. Solids separated in the decanter centrifuge 130 can then be conveyed 14 to a granulator 135 before being dried and packaged for use as a solid organic fertilizer 15.

Liquids separated in the decanter centrifuge 130 can be conveyed 16 to a first stage aerobic bioreactor 140, wherein water 17 can be added and air 19 is sparged. The temperature of the first stage aerobic bioreactor can be maintained at about 65° C. Optionally, a recirculation pump 18 can circulate material in the reactor. After the first stage aerobic bioreactor, the resulting liquid can be passed to a second stage aerobic bioreactor 145, which can also be maintained at a temperature of about 65° C. The liquid in the second stage aerobic reactor 145 can be sparged with air 22. A recirculation pump can also circulate material 23 in the second stage bioreactor. Exhaust gases 20, 24 from both the first stage and second stage bioreactors can optionally be directed to an ammonia-water receiver 160. The liquid stream from the ammonia-water 160 receiver, if used, can then be directed to a base product receiving tank 180 or a formulated product receiving tank 185. Additional organic nutrients, such as, for example, organic nitrogen and/or phosphorus nutrients can optionally be added 34,35 to the treated product stream in-line from the ammonia-water receiver, if used, to the formulated product receiving tank, or directly into the formulated product receiving tank itself.

Treated liquid components from the second stage bioreactor can be conveyed 25 to a sterilizer 150, where steam 27 is used to heat the liquid, which can then be conveyed 29, 30 to a base product receiving tank 180 or a formulated product receiving tank 185. Additional organic nutrients, such as, for example, organic nitrogen and/or phosphorus nutrients can optionally be added 34, 35 to the treated product stream in-line from the ammonia-water receiver, if used, to the formulated product receiving tank, or directly into the formulated product receiving tank itself.

What is claimed is:

1. A process for manufacturing a fertilizer product from animal waste, the process comprising:
   a. providing an animal waste composition comprising the animal waste;
   b. adjusting the pH of the animal waste composition to about 5.5 or higher to produce a stabilized animal waste composition;
   c. separating a solid component and a liquid component of the stabilized animal waste composition; and
   d. subjecting the separated liquid component and, optionally, the separated solid component to at least one further processing step to produce at least one fertilizer;
   wherein the stabilized animal waste composition, and/or the separated liquid component is subjected to an autothermal thermophilic aerobic bioreaction that comprises maintaining the stabilized animal waste composition and/or the separated liquid component under aerobic condition and at a temperature suitable for the growth of thermophilic bacteria for a period of time; and wherein the animal waste composition and the separated liquid component of the stabilized animal waste composition are maintained at a pH of about 5.5 or higher throughout the process.

2. The process of claim 1, wherein the animal waste comprises poultry manure.

3. The process of claim 2, wherein the poultry manure is chicken manure.

4. The process of claim 1, wherein the pH of the animal waste composition is adjusted by adding an acid.

5. The process of claim 1, wherein the stabilized animal waste composition is aerated before the separating step.

6. The process of claim 1, wherein the stabilized animal waste composition is heated to between about 50° C. to about 80° C. before the separating step.

7. The process of claim 1, wherein the autothermic thermophilic bioreaction is performed on the separated liquid component.

8. The process of claim 1, wherein the autothermal thermophilic aerobic bioreaction comprises heating the stabilized animal waste composition and/or the separated liquid component to a temperature of at least about 45° C. for the period of time.

9. The process of claim 1, wherein the aerobic conditions in the autothermal thermophilic aerobic bioreaction comprise a dissolved oxygen level of at least about 4 mg/l.

10. The process of claim 1, which produces both a solid fertilizer and a liquid fertilizer from the animal waste.

11. A liquid fertilizer composition for application to plants and soils, comprising an autothermal thermophilic aerobic bioreaction product from a liquid fraction of poultry manure, wherein the liquid fraction is maintained at a pH of about 5.5 or higher.

12. The composition of claim 11, wherein the poultry manure is chicken manure.

13. The composition of claim 11, wherein the liquid fraction of poultry manure comprises a liquid fraction of a poultry manure slurry comprising between about 80% and 90% moisture.

14. The composition of claim 13, wherein poultry manure slurry is heated to between about 60° C. and about 75° C. for between about 1 hour and about 4 hours.

15. The composition of claim 11, wherein the autothermal thermophilic aerobic bioreaction of which the composition is a product comprises maintaining the liquid fraction at a temperature of about 45° C. to about 80° C. under aerobic conditions for a predetermined time.

16. The composition of claim 11, comprising at least one additive.

17. The composition of claim 16, wherein the additive is a macronutrient or a micronutrient.

18. The composition of claim 11, formulated for application to soil or a medium in which a plant is growing or will be grown.

19. The composition of claim 11, formulated for application to a seed or plant part.

20. The composition of claim 11, suitable for use in an organic program.

* * * * *